(12) United States Patent
Machado Amorim et al.

(10) Patent No.: US 11,753,085 B2
(45) Date of Patent: Sep. 12, 2023

(54) ASSEMBLY OF AN ALUMINUM COMPONENT AND OF A PRESS HARDENED STEEL PART HAVING AN ALLOYED COATING COMPRISING SILICON, IRON, ZINC AND MAGNESIUM, THE BALANCE BEING ALUMINUM

(71) Applicant: ArcelorMittal, Luxembourg (LU)

(72) Inventors: Tiago Machado Amorim, Longeville les Metz (FR); Stephane Morel, Metz (FR); Laurence Dosdat, Rozerieulles (FR); Astrid Gregoire, Amneville (FR)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 17/602,230

(22) PCT Filed: Apr. 3, 2020

(86) PCT No.: PCT/IB2020/053192
§ 371 (c)(1),
(2) Date: Oct. 7, 2021

(87) PCT Pub. No.: WO2020/208489
PCT Pub. Date: Oct. 15, 2020

(65) Prior Publication Data
US 2022/0177051 A1   Jun. 9, 2022

(30) Foreign Application Priority Data

Apr. 3, 2020   (WO) .................. PCT/IB2020/053192

(51) Int. Cl.
*B32B 15/01* (2006.01)
*B62D 29/00* (2006.01)
(Continued)

(52) U.S. Cl.
CPC ......... *B62D 29/007* (2013.01); *B21D 35/005* (2013.01); *B21D 39/00* (2013.01);
(Continued)

(58) Field of Classification Search
None
See application file for complete search history.

(56) References Cited

U.S. PATENT DOCUMENTS 7,906,220 B2   3/2011   Hattori et al.
10,889,884 B2   1/2021   Allely et al.
(Continued)

FOREIGN PATENT DOCUMENTS

EP   1669153 A   6/2006
EP   1 806200 A1   7/2007
(Continued)

OTHER PUBLICATIONS

See Search Report of PCT/IB2020/053192 dated Apr. 7, 2020.
(Continued)

*Primary Examiner* — Daniel J. Schleis
(74) *Attorney, Agent, or Firm* — Davidson, Davidson & Kappel, LLC

(57) ABSTRACT

An assembly of an aluminum-based part and a press hardened steel part provided with an alloyed coating including in weight percent, 0.1 to 15.0% silicon, 15.0 to 70% of iron, 0.1 to 20.0% of zinc, 0.1 to 4.0% of magnesium, the balance being aluminum, on at least one of the surfaces thereof placed so as to be in contact with the aluminum-based part.

13 Claims, 2 Drawing Sheets

(51) Int. Cl.

| | | |
|---|---|---|
| *B21D 35/00* | (2006.01) | |
| *B21D 39/00* | (2006.01) | |
| *B21D 53/88* | (2006.01) | |
| *B60R 19/03* | (2006.01) | |
| *B62D 25/04* | (2006.01) | |
| *B62D 25/06* | (2006.01) | |
| *B62D 25/14* | (2006.01) | |
| *B62D 25/20* | (2006.01) | |
| *C21D 1/673* | (2006.01) | |
| *C21D 9/00* | (2006.01) | |
| *C21D 9/50* | (2006.01) | |
| *C22C 21/00* | (2006.01) | |
| *C23C 2/12* | (2006.01) | |
| *C23C 2/26* | (2006.01) | |

(52) U.S. Cl.
CPC .......... *B21D 53/88* (2013.01); *B32B 15/012* (2013.01); *B60R 19/03* (2013.01); *B62D 25/04* (2013.01); *B62D 25/06* (2013.01); *B62D 25/145* (2013.01); *B62D 25/20* (2013.01); *C21D 1/673* (2013.01); *C21D 9/0068* (2013.01); *C21D 9/50* (2013.01); *C22C 21/00* (2013.01); *C23C 2/12* (2013.01); *C23C 2/26* (2013.01); *C21D 2261/00* (2013.01)

(56) References Cited

U.S. PATENT DOCUMENTS

| | | | |
|---|---|---|---|
| 10,947,608 B2 * | 3/2021 | Allely | ............ C23C 2/40 |
| 11,414,737 B2 | 8/2022 | Machado Amorim et al. | |
| 2005/0142294 A1 | 6/2005 | Marutian et al. | |
| 2016/0059343 A1 | 3/2016 | Nam et al. | |
| 2017/0291246 A1 | 10/2017 | Sigler et al. | |
| 2017/0297138 A1 * | 10/2017 | Sigler | .................. B23K 11/115 |
| 2018/0216218 A1 | 8/2018 | Machado Amorim et al. | |
| 2018/0223386 A1 | 8/2018 | Allely et al. | |
| 2021/0039355 A1 | 2/2021 | Mitsunobu et al. | |

FOREIGN PATENT DOCUMENTS

| | | | |
|---|---|---|---|
| JP | H01202383 A | 8/1989 | |
| JP | 2005319481 A | 11/2005 | |
| JP | 2009120947 A | 6/2009 | |
| JP | 2015520679 A | 7/2015 | |
| JP | 2018070973 A | 5/2018 | |
| JP | 2018527461 A | 9/2018 | |
| JP | 2018527462 A | 9/2018 | |
| JP | 2018528324 A | 9/2018 | |
| WO | WO02103073 A2 | 12/2002 | |
| WO | WO 2005030424 A1 | 4/2005 | |
| WO | WO 2017/006144 A1 | 1/2017 | |
| WO | WO-2017017483 A1 * | 2/2017 | ............ B32B 15/01 |
| WO | WQ2017017483 A1 | 2/2017 | |
| WO | WO2018158165 A1 | 9/2018 | |
| WO | WO 2018220430 A1 | 12/2018 | |
| WO | WQ2019180853 A1 | 9/2019 | |

OTHER PUBLICATIONS

Matthieu et al.:" Laser brazing of a steel/aluminum assembly with hot filler wire (88% Al, 12% Si)", Materials Science and Engineering: A, Nov. 5, 2006 Elsevier, Amsterdam, NL—ISSN 0921-5093, vol. 435-436, pp. 19-28.

* cited by examiner

ASSEMBLY OF AN ALUMINUM COMPONENT AND OF A PRESS HARDENED STEEL PART HAVING AN ALLOYED COATING COMPRISING SILICON, IRON, ZINC AND MAGNESIUM, THE BALANCE BEING ALUMINUM

The present invention relates to an assembly of an aluminum-based part and a press hardened steel part provided with an alloyed coating comprising silicon, iron, zinc, optionally magnesium, the balance being aluminum, on at least one of the surfaces thereof placed so as to be in contact with the aluminum-based part.

These assemblies are for example intended for use in the manufacture of automotive body parts, such as door openings and the like, without however being limited thereto.

BACKGROUND

For complexes parts of a vehicle such as Bumper beams front/rear; Door reinforcements; Beam amount reinforcement; Middle foot reinforcement; Floor reinforcements; Tunnel reinforcement; Deck rail; Roof crossbars, it is known to use press hardened steel parts coated with an alloyed aluminum-based coating. Indeed, such coated press hardened steel parts ensure security and a good corrosion resistance thanks to the barrier effect of the coating.

The constant need to seek reduction in weight in order to reduce $CO_2$ emissions leads to the need to seek hybrid solutions combining in particular aluminum and a press hardened steel part coated with an alloyed aluminum based coating. However, such a combination generates complex and evolving phenomena of corrosion of the two materials.

The patent application EP1669153 discloses a steel/aluminum welded structure comprising:

a hot-dip Al-coated steel sheet having a coating layer, consisting of, by mass, 3-12% Si, 0.5-5% Fe and the balance being Al except inevitable impurities, and an Al—Fe—Si ternary alloy layer formed at an interface between a steel substrate and the coating layer; and an aluminum or aluminum alloy sheet spot welded to the Al-coated steel sheet;

wherein an area ratio of an Al—Fe binary alloy layer to a whole of an Al/Fe joint boundary is controlled to 90% or less, and an Al—Fe alloy free region exists between the Al—Fe binary alloy layer and the Al—Fe—Si ternary alloy layer.

SUMMARY OF THE INVENTION

However, the hot-dip Al-coated steel sheet comprises a cold rolled steel sheet, i.e. not a press hardened steel part, with which is not possible to produce complex parts. Moreover, the corrosion resistance of this assembly continues to remain far too low over time, and therefore it exists a need for improvement thereof.

Moreover, it is known that an assembly of a press hardened steel part with an aluminum panel has a poor corrosion resistance since the steel accelerates the kinetic corrosion of the aluminum panel.

It is an object of the present invention to provide an assembly of a press hardened steel part with an aluminum-based part having an excellent resistance to corrosion compared to the assembly of the prior art.

The present invention provides an assembly (1) of at least an aluminum-based element (2) and a press-hardened steel part (3), said hardened steel part provided on at least one of the surfaces thereof, with an alloyed coating comprising in weight percent, 0.1 to 15.0% silicon, 15.0 to 70% of iron, 0.1 to 20.0% of zinc, 0.1 to 4.0% of magnesium, the balance being aluminum, inevitable impurities and possibly one or more additional elements selected from among Sb, Pb, Ti, Ca, Mn, Sn, La, Ce, Sr, Cr, Ni or Bi, the said hardened steel part (3) being joined to the said aluminum-based element (2).

BRIEF DESCRIPTION OF THE DRAWINGS

The invention will now be illustrated by means of indicative examples given for information purposes only, and without limitation, with reference made to the accompanying figures in which.

DETAILED DESCRIPTION

Figure 1:
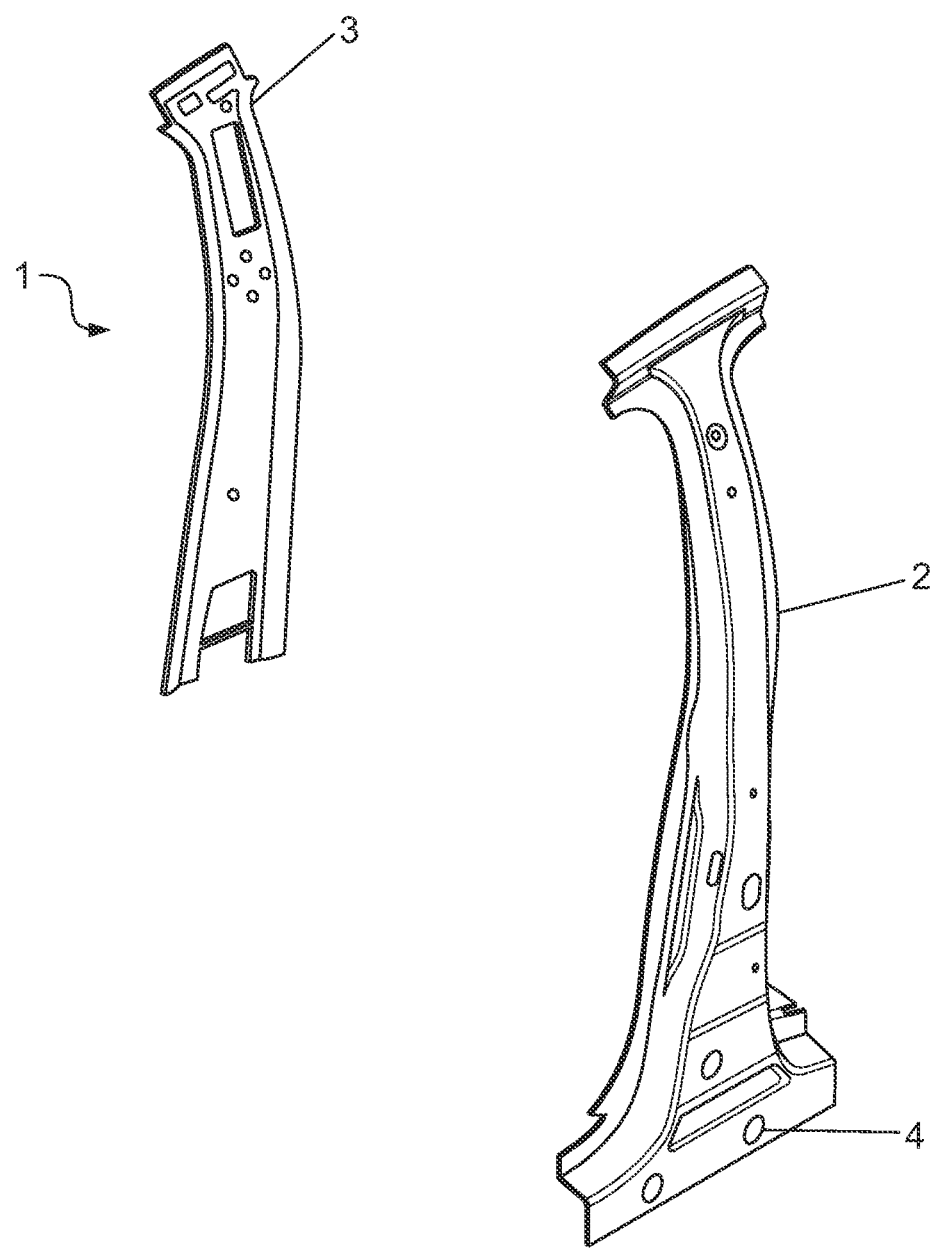
FIG. 1 schematically represents an assembly according to the invention.

The designation press hardened steel part means a hot-formed or hot-stamped steel sheet having a tensile strength up to 2500 MPa and more preferably up to 2000 MPa. For example, the tensile strength is above or equal to 500 MPa, advantageously above or equal to 1200 MPa, preferably above or equal 1500 MPa. For example, the steel is chosen from among: Usibor® 1000, Usibor® 1500, Ductibor® 1000 and Usibor® 2000.

The designation of an aluminum-based element means pure aluminum and all of its alloys comprising at least 85% by weight of aluminum, including therein the 1000 to 7000 series which comprise aluminum without any alloying additive element and alloys of various compositions:

aluminum without alloying element: 1000;
aluminum+copper: 2000;
aluminum+manganese: 3000;
aluminum+silicon: 4000;
aluminum+magnesium: 5000;
aluminum+magnesium+silicon: 6000 and
aluminum+zinc+magnesium: 7000.

The invention relates to an assembly 1 of at least an aluminum-based element 2 and a press hardened steel part 3 provided on at least one of the surfaces thereof, with an alloyed coating comprising silicon, iron, zinc, optionally magnesium, the balance being aluminum, inevitable impurities and possibly one or more additional elements selected from among Sb, Pb, Ti, Ca, Mn, Sn, La, Ce, Cr, Sr, Ni or Bi, the said press hardened steel part 3 being joined to the said aluminum-based element 2.

Although the electrochemical potential of the coated press hardened steel part alone is between −0.68 and −0.75V, i.e. very close to the one of the steel being of −0.6 and −0.78V with respect to a saturated calomel electrode (SCE), leading to a bad sacrificial protection, the assembly according to the present invention has a high resistance to corrosion compared to the assembly of the prior art. The inventors have found that there is a synergy between the aluminum-based element and the press hardened steel part coated with an alloyed coating comprising silicon, iron, zinc, optionally magnesium, the balance being aluminum. Indeed, it is believed that an oxide layer is present on the surface of the alloyed coating of the press hardened steel part. This oxide layer has a barrier effect leading to a decrease of the corrosion kinetic and a decrease of the electrogalvanic coupling between the aluminum component and the press hardened steel part. Thus, against all odds, the corrosion resistance is significantly improved in the assembly zone.

According to the invention, the first aluminum-based element can take the form of a panel 2. This panel 2 has suitable dimensions adapted to the subsequent use of the assembly according to the invention. In a preferred embodiment, the assembly 1 in question is a B-pillar. Advantageously, the aluminum-based panel is positioned on the exterior side of the vehicle.

The aluminum-based panel 2 may further include on at least one part of its surface one or more protective coatings such as phosphating and/or cataphoresis type coatings, such as those usually applied on the bodies-in-white for vehicles. The assembly with the second press hardened steel coated part 3 being generally performed prior to the passage of the body-in-white in the baths containing coating types like phosphating and/or cataphoresis coatings. The parts situated outside the assembly zone are coated. The assembly zone can be only partially coated due to a low penetration of the coating inside the assembly zone.

The second element of the assemblies according to the invention is thus a press hardened steel part 3 provided on at least one of the surfaces thereof, with an alloyed coating comprising in weight percent, 0.1 to 15.0% silicon, 15.0 to 70% of iron, 0.1 to 20.0% of zinc, 0.1 to 4.0% of magnesium, the balance being aluminum, inevitable impurities and possibly one or more additional elements selected from among Sb, Pb, Ti, Ca, Mn, Sn, La, Ce, Cr, Ni, Sr or Bi.

The content by weight of each additional element is generally less than 0.3%. The additional elements may, among other things, provide the ability to improve the ductility or adhesion of the coating on to the steel element. The person skilled in the art who knows their effects on the characteristics of the coating will know to use them according to the additional or complementary desired goal.

The coating may finally contain residual elements originating, for example, from the coating bath when use is made of a hot dip coating process. It may be contaminated with impurities derived from the feed ingots or resulting from the passage of the steel element in the coating bath.

Preferably, the alloyed coating of the press hardened steel part comprises between 5.0 and 14% by weight of zinc and for example between 7.0 and 12.0% by weight.

Preferably, the alloyed coating of the press hardened steel part comprises from 0.1 to 6.0% by weight of silicon and for example between 2.0 and 6.0% by weight of silicon.

Preferably, the alloyed coating of the press hardened steel part comprises from 1.0 to 4.0% by weight of magnesium.

Advantageously, the alloyed coating of the press hardened steel part comprises between 40 and 60 wt. % of iron The iron is derived from the feed ingots or resulting from the passage of the steel element in the coating bath and from the steel during the austenitization treatment.

Preferably, the alloyed coating comprises an intermetallic layer $Fe_3Al$ and an interdiffusion layer Fe—Si—Al.

Advantageously, the microstructure of the metallic coating comprises $Zn_2Mg$ phase or $Mg_2Si$ phase or both.

The metal coating generally has a thickness that is less than or equal to 30 μm or even 25 μm and greater than or equal to 3 μm or even 5 μm.

As previously mentioned above, the two elements 2, 3 are assembled in a manner such that the coated surface of the press hardened steel part 3 is in at least partial contact with the aluminum-based element 2. In a preferred embodiment, the assembly may be done in particular by adhesive bonding, welding, sealing, crimping, clinching or riveting of the two elements in an assembly zone 4 located, in the example shown in FIG. 1.

For example, the welding can be performed by spot welding, laser ablation welding or arc welding.

Such crimping could consist of a simple folding of one of the elements around the other, as shown in FIG. 1 where the element 2 is arranged so as to envelope the element 3. It is of course possible to carry out any other type of mechanical assembly known to the person skilled in the art.

It is also possible to assemble the panels according to the invention by means of structural bonding making use of an adhesive or a structural sealant which enables an assembly such that the mechanical stresses to which one or the other of the elements 2, 3 are subjected get transferred to the other element 3, 2. The layers of adhesives and/or sealants being very thin (generally less than 5 mm, or even less than 1 mm and even less than 200 μm), it would be considered that such a bonded assembly amounts to putting in contact the two elements 2, 3 in the same way as a simple mechanical assembly.

It is quite obviously possible to combine structural bonding and mechanical assembly in order to enhance the robustness of the assembly.

The invention also relates to a method for the manufacture of an assembly according to the present invention comprising:

A. The provision of a steel sheet pre-coated on at least one of the surfaces with a pre-coating comprising in weight percent, 0.1 to 20.0% silicon, 0 to 10% of iron, 0.1 to 25.0% of zinc, 0.1 to 6.0% of magnesium, the balance being aluminum, inevitable impurities and possibly one or more additional elements selected from among Sb, Pb, Ti, Ca, Mn, Sn, La, Ce, Cr, Ni or Bi, B. the cutting of the pre-coated steel sheet to obtain a blank, C. the austenitization treatment of the blank to obtain a fully austenitic microstructure in the steel, D. the transfer of the blank into a press tool, E. the hot-forming of the blank, F. the cooling of the blank to obtain the press hardened steel part (3) provided on at least one of the surfaces with an alloyed coating comprising silicon, iron, zinc, optionally magnesium, the balance being aluminum, inevitable impurities and possibly one or more additional elements selected from among Sb, Pb, Ti, Ca, Mn, Sn, La, Ce, Cr, Ni or Bi and G. the assembly of the press hardened steel part provided on at least one of the surfaces with said alloyed coating with an aluminum-based element.

For example, in step A), the steel sheet can be pre-coated by hot-dip coating, by physical vapor deposition or by electrodeposition. Preferably, the steel sheet is pre-coated by hot-dip coating.

After, the steel sheet pre-coated with the pre-coating according to the present invention is cut to obtain a blank in step B).

Preferably, in step C), the austenitization treatment is applied to the blank in a furnace under non-protective atmosphere at an austenitization temperature between 800 and 1100° C., more preferably between 800 and 1000° C. and advantageously between 880 and 930° C. Advantageously, said blank is maintained during a dwell time tm between 1 to 12 minutes, preferably between 3 to 9 minutes. During the thermal treatment before the hot-forming, the coating forms an alloy layer comprising silicon, iron, zinc, optionally magnesium, the balance being aluminum and having a high resistance to corrosion, abrasion, wear and fatigue. The steel diffuses iron into the pre-coating.

In step E), the blank is transferred to a hot-forming tool and hot-formed, for example at a temperature between 600 and 900° C. The hot-forming can be the hot-stamping or the roll-forming. Preferably, the blank is hot-stamped.

In step F), the part is then cooled in the hot-forming tool or after the transfer to a specific cooling tool.

Preferably, in step G), the press hardened steel part (3) is joined to the said aluminum-based element (2) by adhesive bonding, by welding, by sealing, by crimping, by clinching or by riveting.

For automotive application, after the phosphating step, the part is dipped in an e-coating bath. Usually, the thickness of the phosphate layer is between 1 and 2 μm and the thickness of the e-coating layer is between 15 and 25 μm, preferably inferior or equal to 20 μm. The cataphoresis layer ensures an additional protection against corrosion.

After the e-coating step, other paint layers can be deposited, for example, a primer coat of paint, a basecoat layer and a top coat layer.

Before applying the e-coating on the part, the part is previously degreased and phosphated so as to ensure the adhesion of the cataphoresis.

The invention relates to a press hardened steel part for a vehicle comprising at least one assembly 1 according to the present invention.

The invention relates to a press hardened steel part according to the present invention is a front beam, a rear bumper beam, a door reinforcement, a windscreen upright reinforcement, a B-pillar reinforcement, a floor and a roof reinforcement, a Roof or a dash panel cross member.

The invention relates to a vehicle including at least said press hardened steel part.

Finally, the invention relates to use of an assembly according to the present invention for the manufacture of press hardened steel parts or a vehicle.

With a view to highlighting the enhanced performance obtained through using the assemblies according to the invention, some concrete examples of embodiments will be detailed in comparison with assemblies based on the prior art.

Examples

Steel sheets made of Usibor® were coated with zinc or aluminum alloys of variable composition as gathered in Table 1, with a uniform thickness of 20 μm on both sides. Such steel sheets were then press hardened at 900° C. during 5 minutes to obtain parts with an alloyed composition as described in Table 2. Assembly samples were then created with panels made of aluminum AA6061 and those coated press hardened parts.

The panels made of aluminum AA6061 and coated press hardened steel parts were joined with an adhesive tape leaving a gap of 120 μm in the assembly zone according to norm SEP1160. The edges of the panels were then linked together with an electrical wire to create an electro-galvanic coupling. No coating was present in the assembly zone.

The assembly samples of aluminum panels and press hardened steel parts were subjected to the VDA 233-102 test, which provides for subjecting the samples to a series of treatment cycles, each cycle lasting for one week, with a succession of sub-cycles A, B and C of 24 hours each:

Cycle A: cycle including a treatment for a period of three hours by placing in the presence of a salt spray mist at 35° C.;

Cycle B: cycle of 24 hours without treatment with a salt spray mist at a temperature varying between 25° C. and 50° C. and a relative humidity varying between 70% and 95%;

Cycle C: cycle without treatment with a salt spray mist, at a temperature varying between −15° C. and 50° C. and a relative humidity varying between 70% and 95%.

The saline solution used is an aqueous solution containing 1% by weight of sodium chloride.

At the end of each cycle, a first sample was subjected to measurements of depth of corrosion etching of the aluminum element by laser triangulation mapping over the entire surface of a sample, followed by the extraction of the maximum observed value in micrometers.

Figure 2:
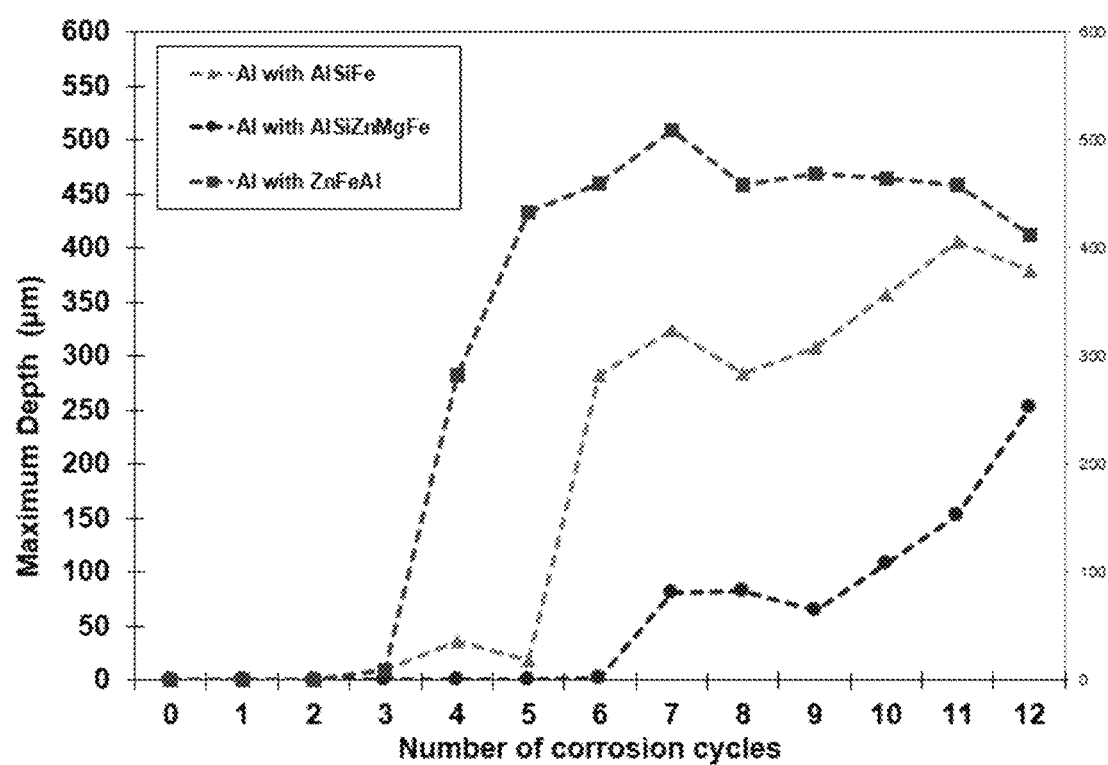
FIG. 2 represents the measurement curves depicting the evolution of the maximum depth of corrosion of the aluminum panels within the assemblies according to the invention in comparison to assemblies according to the prior art.

The results at 6 and 12 cycles are summarized and presented in Table 3 and the detailed results, cycle by cycle are presented in FIG. 2.

TABLE 1

Steel sheets coating compositions
The steel sheets before press hardening were
having the following coating compositions:

| Sample | Zn (wt. %) | Si (wt. %) | Fe (wt. %) | Mg (wt. %) | % Al by weight |
|---|---|---|---|---|---|
| 1 | balance | — | — | — | 0.2 |
| 2 | — | 9 | — | — | Balance |
| 3 | 12 | 3 | — | 2 | Balance |

After press hardening at 900° C. during 5 minutes, the steel parts were covered by an alloyed coating with the compositions gathered in Table 2 below.

TABLE 2

Steel parts with alloyed coating composition

| Sample | Zn (wt. %) | Si (wt. %) | Fe (wt. %) | Mg (wt. %) | % Al by weight |
|---|---|---|---|---|---|
| 1 | balance | — | 50 | — | 0.08 |
| 2 | — | 4 | 46 | — | Balance |
| 3* | 4 | 1.8 | 50 | 0.8 | Balance |

*according to the present invention

TABLE 3

Maximum depth of corrosion

| Sample | depth maximum (μm) after 6 cycles | depth maximum (μm) after 12 cycles |
|---|---|---|
| 1 | 450 | 420 |
| 2 | 300 | 380 |
| 3* | 0 | 250 |

*according to the present invention

Trial 3 according to the present invention shows a high improvement of the corrosion resistance compared to Trials 1 and 2.

What is claimed is:

1. An assembly comprising:
an aluminum-based element; and
a press-hardened steel part having an alloyed coating provided on at least one of the surfaces of the hardened steel part, the alloyed coating comprising in weight percent, 0.1 to 15.0% silicon, 15.0 to 70% of iron, 0.1 to 20.0% of zinc, 0.1 to 4.0% of magnesium, a balance being aluminum, inevitable impurities and optionally one or more additional elements selected from the group consisting of Sb, Pb, Ti, Ca, Mn, Sn, La, Ce, Sr, Cr, Ni and Bi, the hardened steel part being joined to the aluminum-based element.

2. The assembly as recited in claim 1 wherein the alloyed coating comprises an intermetallic layer $Fe_3Al$ and an interdiffusion layer Fe—Si—Al.

3. The assembly as recited in claim 1 wherein a microstructure of the alloyed coating comprises at least one of an $Zn_2Mg$ phase and a $Mg_2Si$ phase.

4. The assembly as recited in claim 1 wherein the press hardened steel part is joined to the aluminum-based element by adhesive bonding, welding, sealing, crimping, clinching or riveting.

5. The assembly as recited in claim 1, wherein the alloyed coating comprises the one or more additional elements, and a content of each additional element is less than 0.3%.

6. A method for the manufacture of the assembly as recited in claim 1 comprising:
- A. providing a steel sheet pre-coated on at least one of the surfaces with a pre-coating comprising in weight percent, 0.1 to 20.0% silicon, 0 to 10% of iron, 0.1 to 25.0% of zinc, and 0.1 to 6.0% of magnesium, a balance being aluminum, inevitable impurities and optionally one or more additional elements selected from the group consisting of Sb, Pb, Ti, Ca, Mn, Sn, La, Ce, Cr, Ni and Bi;
- B. cutting the pre-coated steel sheet to obtain a blank;
- C. austenitization treating the blank to obtain a fully austenitic microstructure in the steel;
- D. transferring the blank into a press tool;
- E. hot-forming of the blank;
- F cooling the blank to obtain the press hardened steel part with the alloyed coating; and
- G. assembling the press hardened steel part with the aluminum-based element.

7. The method as recited in claim 6 wherein in step C), the austenitization treatment is performed between 800 and 1100° C.

8. The method as recited in claim 6 wherein in step E), the hot-forming is performed by hot-stamping or roll-forming.

9. The method as recited in claim 6 wherein in step G), the press hardened steel part is joined to the aluminum-based element by adhesive bonding, welding, sealing, crimping, clinching or riveting.

10. A part for a vehicle comprising the assembly as recited in claim 1.

11. The part as recited in claim 10 wherein the part is a front beam, a rear bumper beam, a door reinforcement, a windscreen upright reinforcement, a B-pillar reinforcement, a floor and a roof reinforcement, a Roof or a dash panel cross member.

12. A vehicle comprising the part as recited in claim 10.

13. A method comprising using the assembly as recited in claim 1 for manufacture of a part for a vehicle or for manufacture of a vehicle.

* * * * *